US012252090B1

(12) United States Patent
Kim et al.

(10) Patent No.: US 12,252,090 B1
(45) Date of Patent: Mar. 18, 2025

(54) INSTRUMENT PANEL TOPPER SYSTEM FOR DUAL HORIZON DISPLAY WITH ENCAPSULATED PASSENGER SIDE AIRBAG DOOR

(71) Applicant: Ford Global Technologies, LLC, Dearborn, MI (US)

(72) Inventors: Yoon Kim, Northville, MI (US); Israel Martinez Martinez, Toluca (MX); Alejandro Nieto Gaspar, Toluca (MX); Francisco Ronquillo Melendez, Puebla (MX); Thomas Junior Luckett, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/825,463

(22) Filed: Sep. 5, 2024

(51) Int. Cl.
*B60R 21/205* (2011.01)
*B60R 21/16* (2006.01)
*B60R 21/215* (2011.01)
*B60R 21/2165* (2011.01)

(52) U.S. Cl.
CPC ........ *B60R 21/205* (2013.01); *B60R 21/2165* (2013.01); *B60R 2021/161* (2013.01); *B60R 2021/21537* (2013.01)

(58) Field of Classification Search
CPC .............. B60R 21/205; B60R 21/2165; B60R 2021/21537; B60R 2021/161
See application file for complete search history.

(56) References Cited

U.S. PATENT DOCUMENTS

| 5,451,075 | A | 9/1995 | Parker et al. |
| 5,845,931 | A | 12/1998 | Nagy et al. |
| 6,565,115 | B2 | 5/2003 | Streck |
| 6,612,613 | B1 * | 9/2003 | Hodges ............... B60R 21/2165 296/70 |
| 2010/0230939 | A1 | 9/2010 | Mazzocchi et al. |
| 2013/0001929 | A1 | 1/2013 | Mazzocchi |
| 2015/0321635 | A1 | 11/2015 | Luckett et al. |
| 2018/0272983 | A1 | 9/2018 | Mazzocchi et al. |
| 2020/0247347 | A1 | 8/2020 | Tay et al. |

FOREIGN PATENT DOCUMENTS

| CN | 116852620 A * | 10/2023 | |
| JP | 3894065 B2 * | 3/2007 | ......... B29C 45/5675 |

* cited by examiner

*Primary Examiner* — Faye M Fleming
(74) *Attorney, Agent, or Firm* — Vichit Chea; Price Heneveld LLP (57) ABSTRACT

An instrument panel for vehicles includes a substrate and a an airbag door assembly having one or more gaps forming openings. The substrate includes a breakaway web below the airbag door assembly. An upper skin extends over a portion of the substrate and the airbag door assembly. Foam is disposed between the substrate and the upper skin. An airbag module is positioned below the breakaway web. When deployed, the airbag causes the breakaway web and foam above the airbag door assembly to rupture.

20 Claims, 9 Drawing Sheets

INSTRUMENT PANEL TOPPER SYSTEM FOR DUAL HORIZON DISPLAY WITH ENCAPSULATED PASSENGER SIDE AIRBAG DOOR

FIELD OF THE DISCLOSURE

The present disclosure generally relates to an instrument panel for vehicles, and specifically to an instrument panel having an encapsulated passenger side airbag door.

BACKGROUND OF THE DISCLOSURE

Various vehicle airbag systems have been developed. Airbags may be positioned in a forward portion of the vehicle cabin in front of the driver and/or passenger sides of the vehicle.

SUMMARY OF THE DISCLOSURE

An aspect of the present disclosure is an instrument panel for vehicles. The instrument panel includes a polymer substrate having a front edge, a rear edge, and a horizontal portion between the front and rear edges. The horizontal portion includes a driver's side and a passenger side. The instrument panel further includes a metal airbag door assembly having a ring structure secured to an upper side of the horizontal portion of the polymer substrate on the passenger side thereof. The ring structure extends around a central opening of the ring structure, and at least one door extends over a portion of the central opening. The door is connected to the ring structure by a hinge, and forms a gap between the door and the ring structure. The polymer substrate includes a breakaway web disposed below the door of the metal passenger airbag door assembly. The instrument panel further includes an upper skin comprising at least one layer of cover material extending over the horizontal portion of the polymer substrate and the metal airbag door assembly. Foam is disposed between the polymer substrate and the upper skin. The foam encapsulates the metal airbag door assembly whereby foam is disposed between the metal airbag door assembly and the upper skin. The instrument panel further includes an airbag module positioned below the breakaway web. When the airbag is deployed, the airbag breaks through the breakaway web and foam above the metal airbag door assembly, thereby causing the door to move upwardly about the hinge, whereby the upper skin ruptures to permit the airbag to expand and deploy above the upper skin.

Embodiments of the first aspect of the present disclosure can optionally include any one or a combination of the following features:

- The hinge optionally comprises metal that is configured to bend as the door moves upwardly when the airbag is deployed.
- The door and the ring structure may be integrally formed from a single sheet of metal.
- The door may comprise a first door, and a second door may be connected to the ring structure whereby edges of the first and second door rotate upwardly relative to the ring structure, and away from each other when the airbag is deployed.
- The first door and the second door may be connected to the ring structure by metal hinges that are U-shaped in cross section with upwardly opening channels.
- The breakaway web may have a first thickness, and a region of the polymer substrate surrounding the breakaway web may have a second thickness that is greater than the first thickness.
- The breakaway web may be integrally formed with the region of the polymer substrate surrounding the breakaway web.
- The ring structure may be secured to the region of the polymer substrate surrounding the breakaway web by mechanical fasteners.
- The front edge of the polymer substrate may have a contour that is configured to correspond to a contour of a lower portion of a windshield of a vehicle. The instrument panel may include a curved panel extending along the front edge of the polymer substrate at a junction of the curved panel and the polymer substrate, wherein the curved panel has a central portion including an angled step surface that faces upwardly and rearwardly. The instrument panel may further include an upright dual horizon display extending along the front edge of the polymer substrate. The dual horizon display may have a concave rear surface extending upwardly in front of the driver's and passenger's sides of the horizontal portion of the polymer substrate.
- The dual horizon display may include an upright convex front surface that is spaced apart from the angled step surface of the curved panel to form a gap therebetween that is V-shaped in cross section.
- The instrument panel may include a brow structure extending along the rear edge of the polymer substrate. The brow structure may include an upwardly facing upper surface extending between front and rear edges of the upper surface. The brow structure may further include a forwardly facing step surface extending between the upper skin and the front edge of the upper surface of the brow structure.
- The airbag module may be configured to deploy the airbag upwardly and rearwardly whereby the airbag moves upwardly and rearwardly over the step surface and the upper surface of the brow structure.
- The upper surface of the brow structure may have a convex curvature, and the rear edge of the upper surface of the brow structure may be lower than the front edge of the upper surface of the brow structure.

According to a second aspect of the present disclosure, an instrument panel for vehicles includes a substrate having a front edge, a rear edge, and a central portion between the front and rear edges. An airbag door assembly has a base structure and at least one door connected to the base structure by a hinge. An upper skin extends over at least a portion of the substrate and over the airbag door assembly. Foam is disposed between the substrate and the upper skin and between the airbag door assembly and the upper skin. An airbag module is positioned below the substrate whereby, when the airbag module is deployed, an airbag of the airbag module expands and breaks through the substrate and foam above the airbag door assembly, thereby causing the at least one door to move upwardly about the hinge whereby the upper skin ruptures to permit the airbag to expand and deploy above the upper skin.

Embodiments of the second aspect of the present disclosure can optionally include any one or a combination of the following features:

- The substrate may include a breakaway web disposed below the door of the airbag door assembly.
- The at least one door and the base structure may be integrally formed from a single sheet of metal.
- The at least one door may comprise first and second doors.
- The base structure may comprise a ring structure extending around the first and second doors. The first and second doors may be pivotably connected to the ring structure, whereby edges of the first and second doors rotate upwardly relative to the ring structure and away from each other when the airbag is deployed.

According to a third aspect of the present disclosure, a vehicle includes a body having a cabin with a front driver side space and a front passenger side space. An instrument panel main substrate is secured to the body and positioned in front of the front driver side space and in front of the front passenger side space. A topper substrate is secured to a top side of the instrument panel main substrate, the topper substrate having a front edge, a rear edge, and a central portion between the front and rear edges, the central portion including a driver's side and a passenger side. An airbag door assembly has a base structure secured to the topper substrate on the passenger side thereof. The airbag door assembly includes at least one door connected to the base structure by a hinge. The topper substrate includes a breakaway web disposed below the door of the airbag door assembly. An upper skin extends over the central portion of the topper substrate and over the airbag door assembly. Foam is disposed between the topper substrate and the upper skin and between the airbag door assembly and the upper skin. An airbag module is positioned below the breakaway web whereby, when the airbag module is deployed, an airbag of the airbag module ruptures the breakaway web and foam above the airbag door assembly, thereby causing the at least one door to pivot upwardly about the hinge whereby the upper skin ruptures to permit the airbag to expand and deploy above the upper skin.

Embodiments of the third aspect of the present disclosure can optionally include any one or a combination of the following features:

The vehicle may include a brow structure extending along the rear edge of the topper substrate.

The brow structure may include an upwardly facing upper surface extending between front and rear edges of the upper surface.

The brow structure may further include a forwardly and upwardly facing angled step surface extending between the upper skin and the front edge of the upper surface of the brow structure.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1;

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
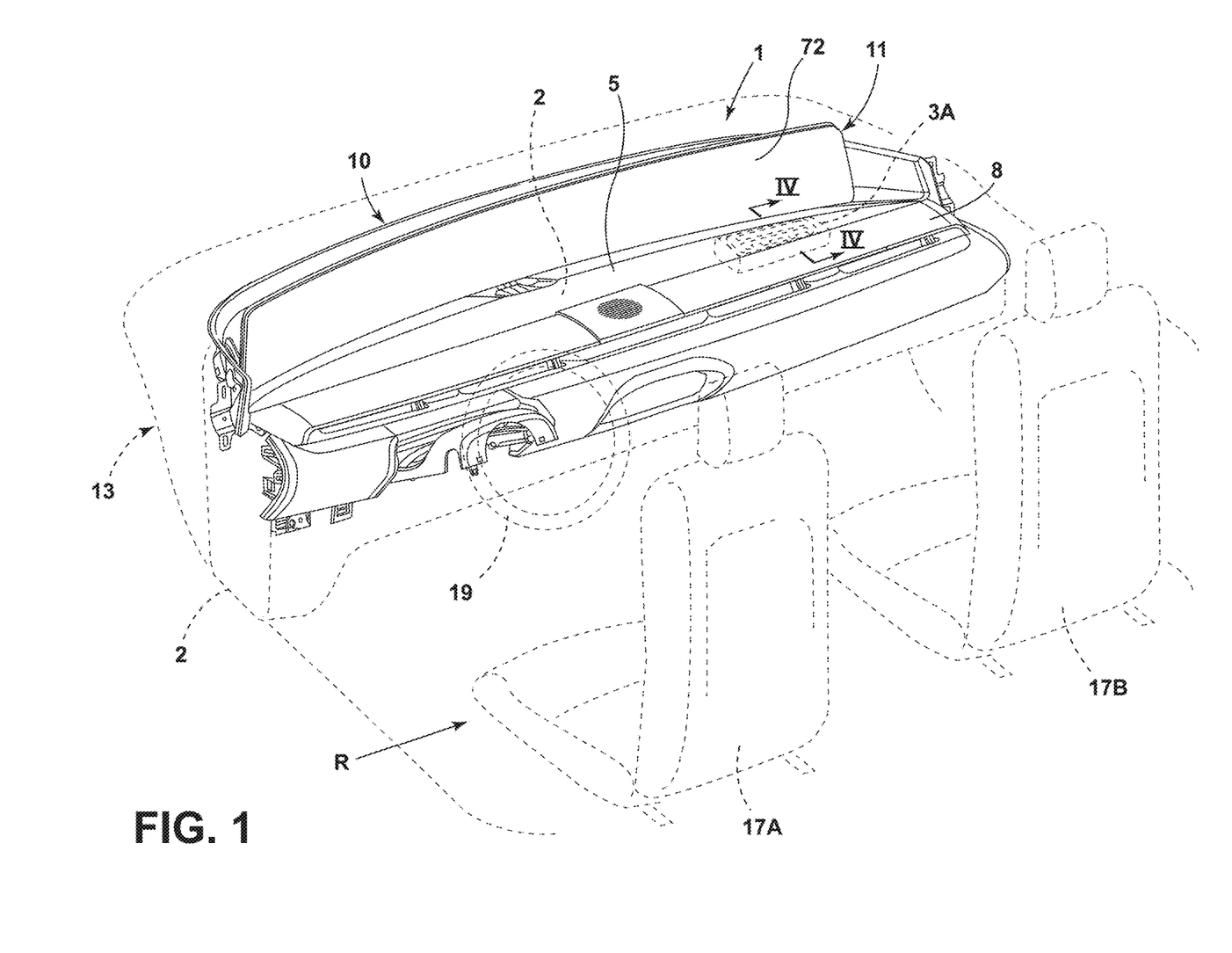
FIG. 1 is an isometric view of an instrument panel for vehicles according to an aspect of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an instrument panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the terms "or" and "and/or," when used in a list of two or more items, means that any one of the listed items can be employed by itself, or any combination of two or more of the listed items can be employed. For example, if a composition or device is described as containing or comprising components A, B, or C, the composition or device can contain (include) A alone; B alone; C alone; A and B in combination; A and C in combination; B and C in combination; or A, B, and C in combination. If a composition or device is described as containing or comprising components A and/or B and/or C, the composition or device can contain (include) A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," "including" or any other variation thereof, are intended to cover a non-exclusive inclusion, such that a process, method, article, or apparatus that includes or comprises a list of elements does not include only those elements but may include other elements not expressly listed or inherent to such process, method, article, or apparatus. An element preceded by "comprises . . . a" or "includes . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
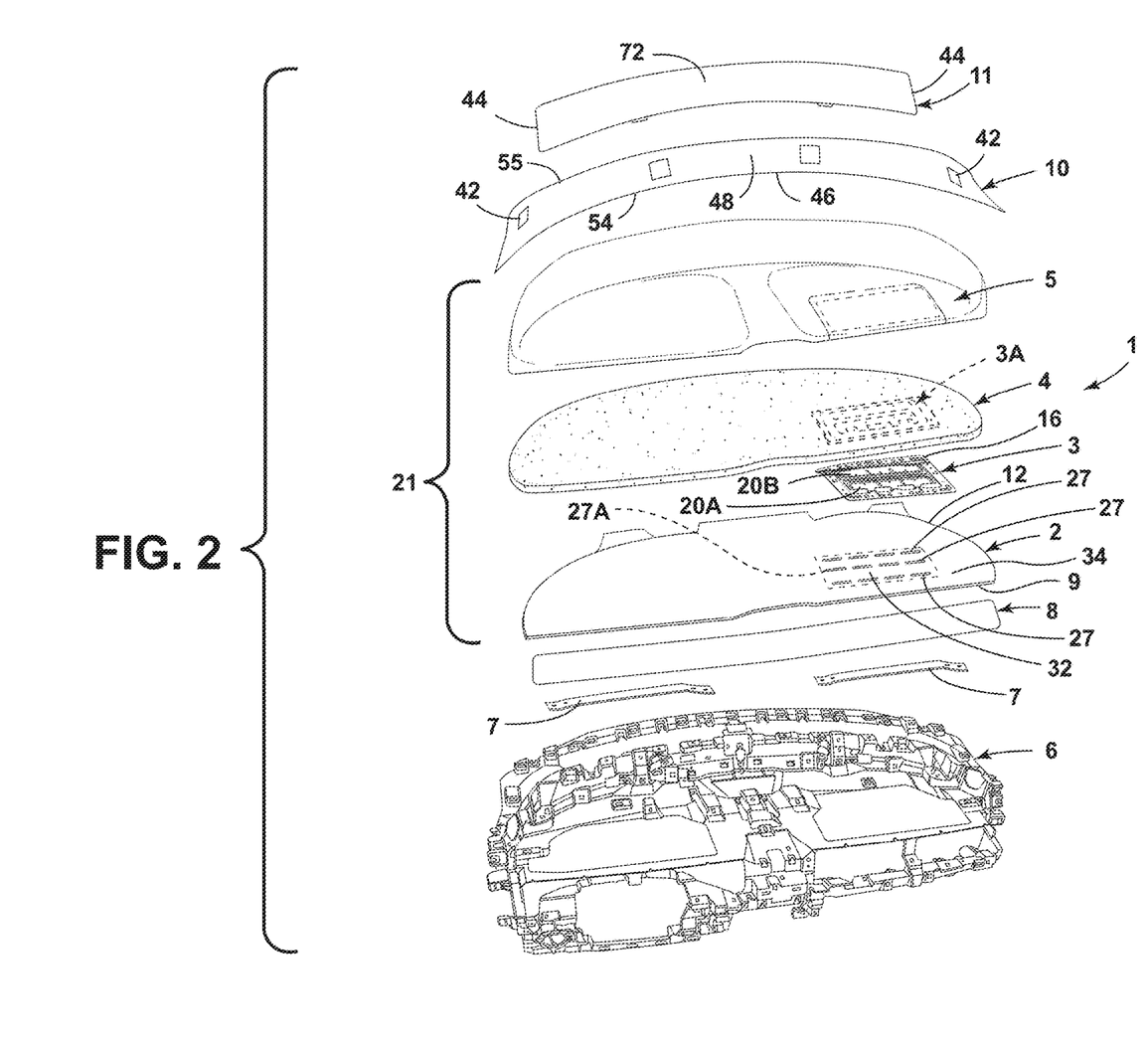
FIG. 2 is an exploded perspective view of the instrument panel of FIG. 1.

With reference to FIGS. 1 and 2, an instrument panel 1 for vehicle according to an aspect of the present disclosure includes a topper substrate 2, a metal airbag door assembly 3 that is covered by foam 4 when assembled (dashed lines 3A), and an upper skin 5 above the foam 4. When instrument panel 1 is assembled, an airbag module 30 (FIG. 4) is positioned below the metal airbag door assembly 3 whereby doors 20A and 20B of metal airbag door assembly 3 pivot upwardly when airbag module 30 is actuated (FIG. 5). Substrate 2 may be secured to a main substrate 6 by brackets 7. When assembled, substrate 2, metal door assembly 3, foam 4, and upper skin 21 generally form a topper structure 21. Main substrate 6 may be secured to a vehicle body 13 of a motor vehicle in front of a first row R of seats including a driver's side seat 17A and a passenger side seat 17B. A steering wheel 19 may be positioned in front of driver's seat 17A. As discussed in more detail below, instrument panel 1 may also include a brow structure 8 that extends along a rear edge 9 of substrate 2 when assembled. Instrument panel 1 may also include a dual horizon display 11 and a sound stage panel 10 that supports speakers (not shown).

Figures 4, 4A:
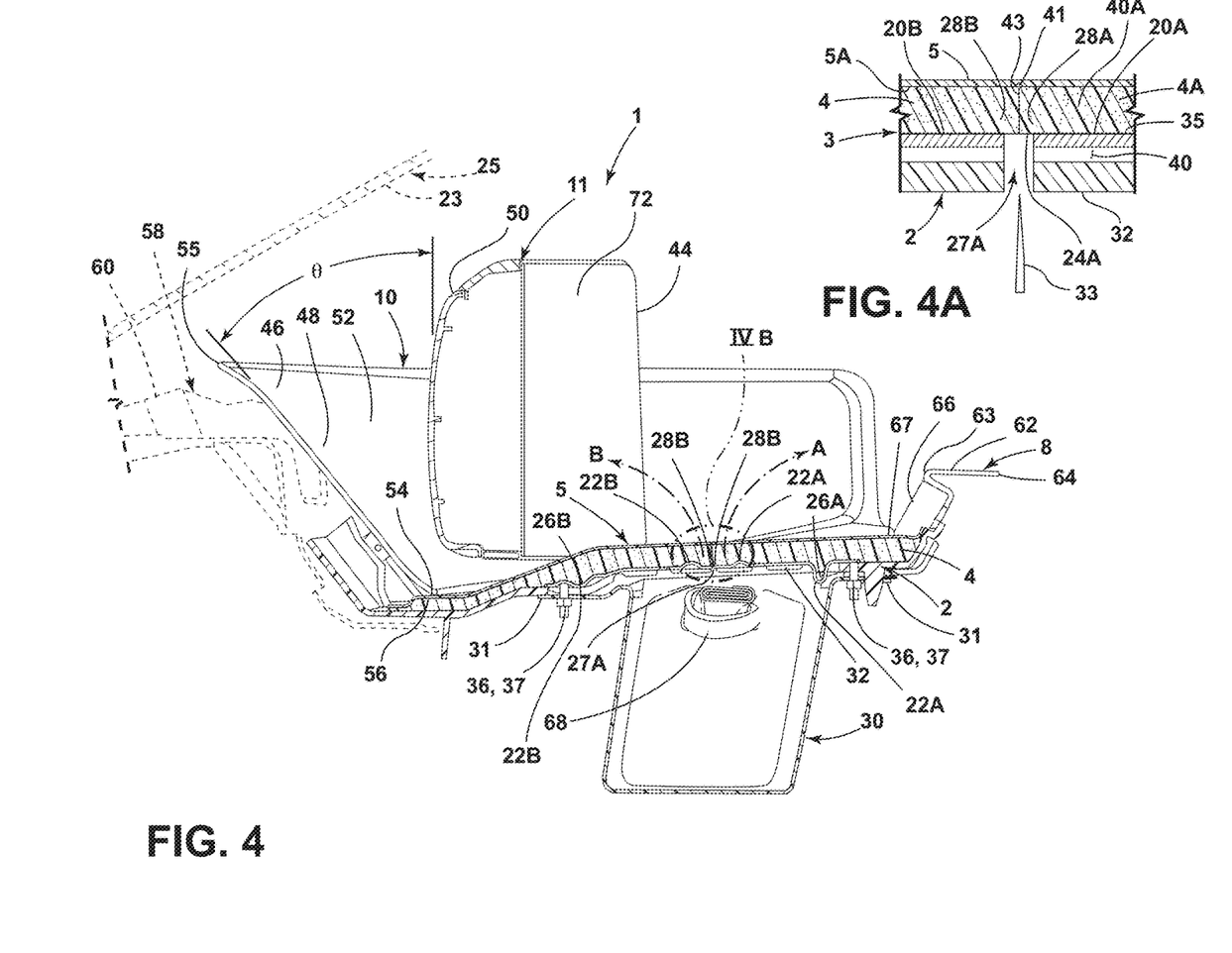
FIG. 4 is a cross-sectional view of the instrument panel of FIG. 1 taken along the line IV-IV.
FIG. 4A is an enlarged fragmentary view of a portion of the instrument panel of FIG. 4.
Figure 5:
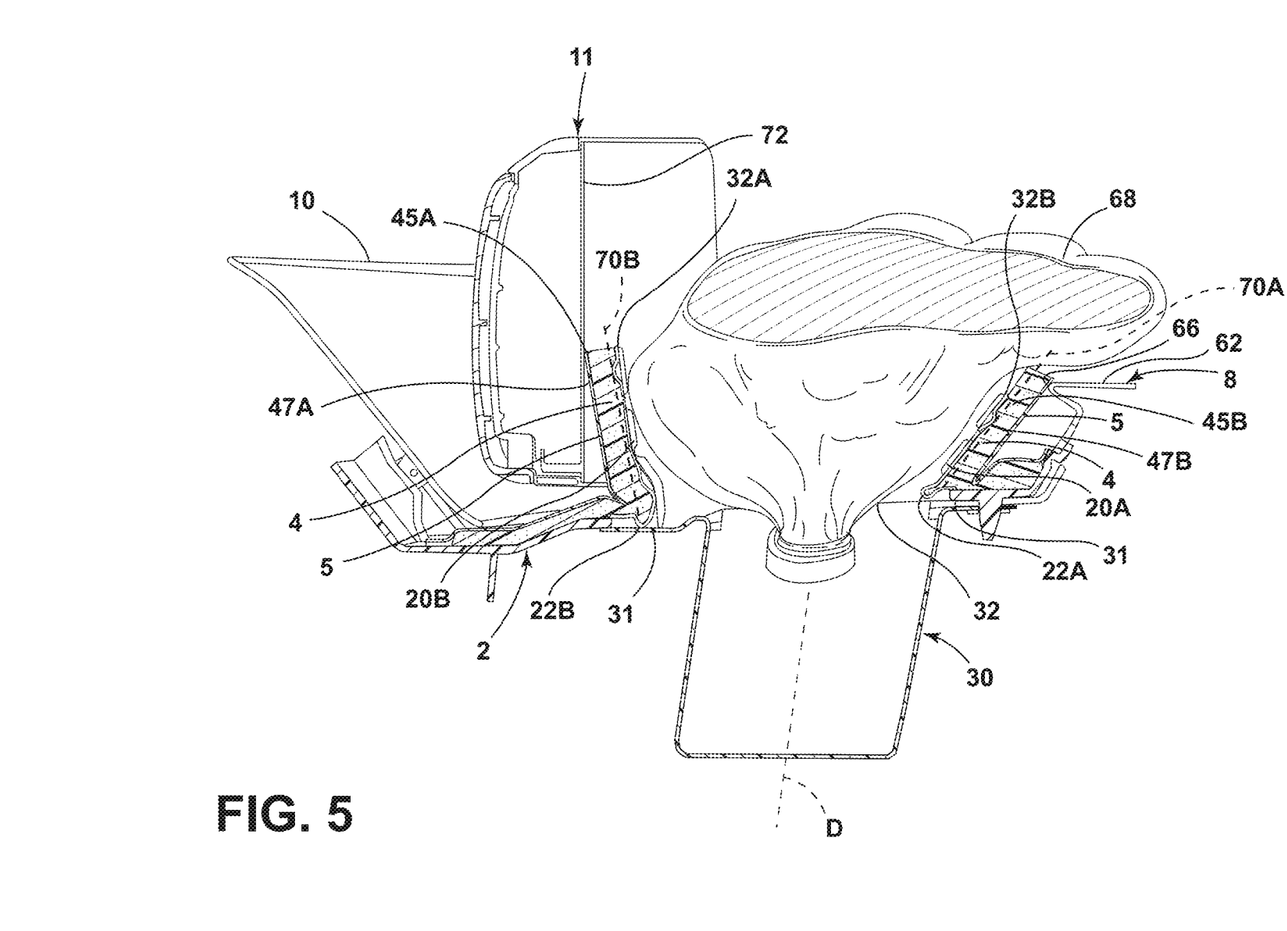
FIG. 5 is a cross-sectional view of the instrument panel of FIG. 4 showing deployment of an airbag.

With reference to FIGS. 1, 2 and 4, sound stage panel 10 may include openings 42 for mounting speakers (not shown) that may be positioned outside of opposite ends 44 of dual horizon display 11, such that sound from the speakers is not blocked by the dual horizon display 11. Sound stage panel 10 includes a central portion 46 with a concave curved surface 48 that faces upwardly and rearwardly. Surface 48 is spaced apart from surface 50 of display 11 to form a gap 52 that is generally V-shaped in cross section as shown in FIG. 4. The surfaces 48 and 50 may form an angle θ that is about 20-60°. A lower edge 54 of panel 10 extends along a junction 56 formed by the engagement of lower edge 54 with upper skin 5 of substrate 2. In general, the lower edge 54 and junction 56 have a curvature (in plan view) corresponding to front edge 12 (FIG. 2) of substrate 2. An upper edge 55 of sound stage panel 10 may be positioned adjacent to a defrost substrate structure 58 (FIG. 4) having one or more openings 60 that are configured to direct defrost air onto a lower surface 23 of a windshield 25.

Referring again to FIG. 2, substrate 2 may comprise a polymer material, and may have a curved front edge 12, a rear edge 9, and a horizontal portion 14 that extends between the front edge 12 and rear edge 9. The front edge 12 may be curved to correspond to a contour of a lower portion of a windshield 25 (FIG. 4) of a vehicle. Substrate 2 may include a breakaway web 32, and a region 34 surrounding the breakaway web 32. The breakaway web 32 may have a reduced thickness relative to a thickness of the region 34 surrounding the breakaway web 32. A plurality of grooves or slots 27 may be formed in breakaway web 32 whereby the substrate 2 has reduced strength above door assembly 3 to thereby permit doors 20A, 20B to rupture/tear through substrate 2 when the airbag module 30 is deployed. The breakaway web 32 is not limited to reduced thickness or slots 27, and breakaway web 32 may have reduced thickness and/or grooves or slots 27 to facilitate rupturing by doors 20A, 20B. The breakaway web 32 and surrounding region 34 may be integrally formed from polymer material.

Figure 3A:
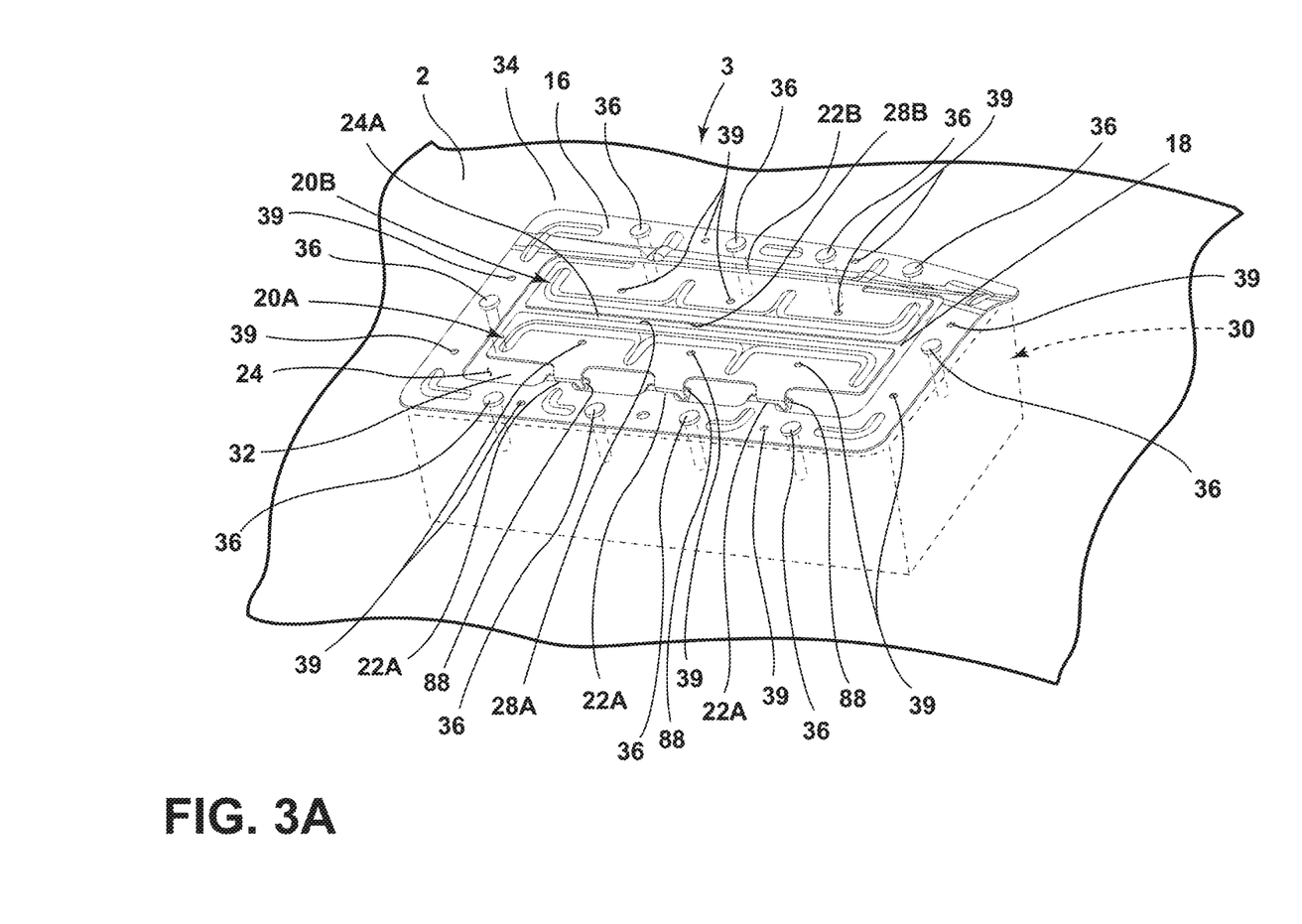
FIG. 3A is partially fragmentary isometric view of an upper side of an airbag door assembly and substrate.
Figure 3B:
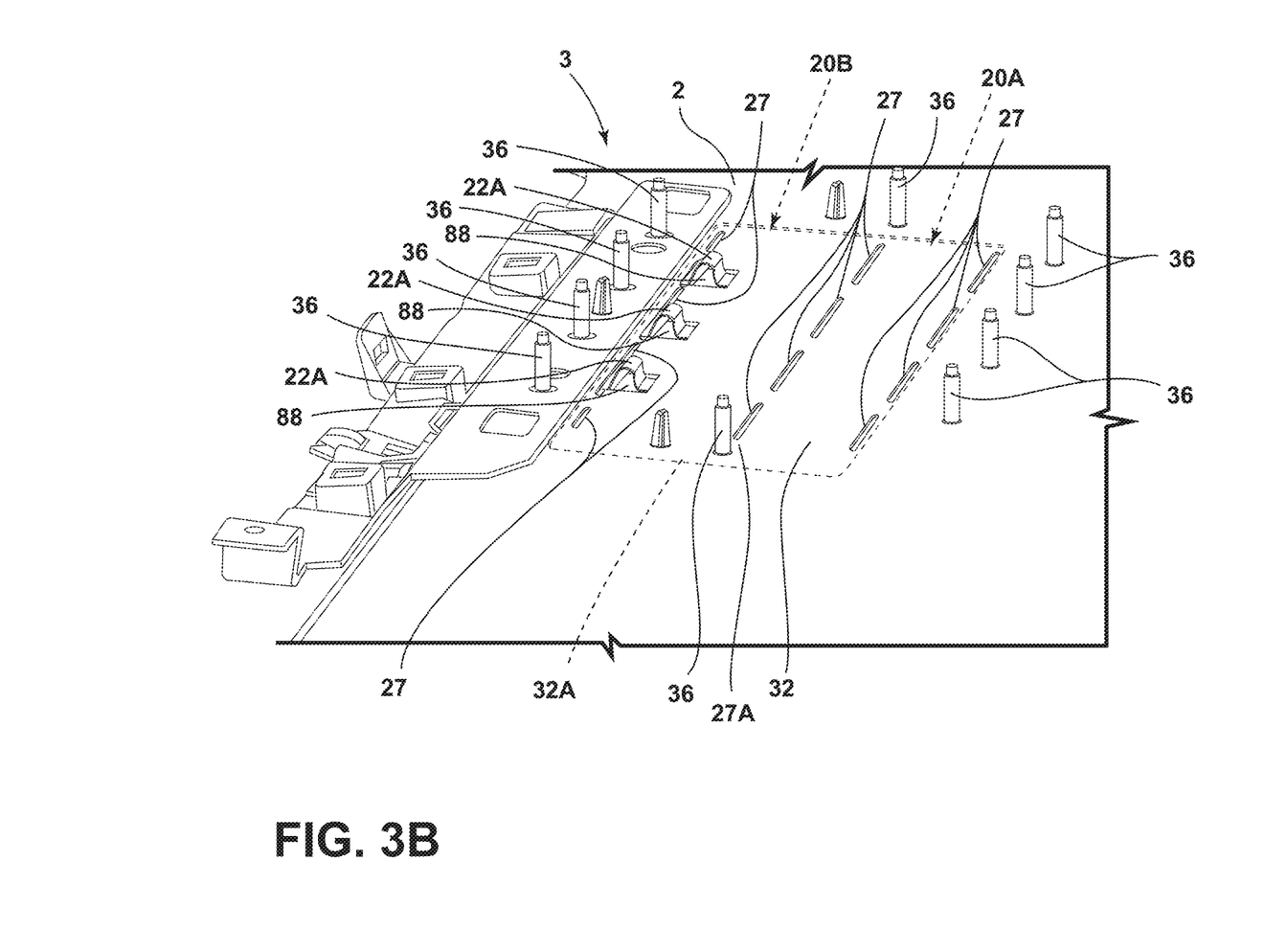
FIG. 3B is partially fragmentary isometric view of the lower side of the substrate and airbag door assembly of FIG. 3A.

With reference to FIGS. 3A and 3B, metal door assembly 3 may include a ring structure 16 that extends around a central opening 18 of door assembly 3, and doors 20A and 20B that are movably interconnected to the ring structure 16 by hinges 22A and 22B, respectively. The hinges 22A and 22B may form upwardly opening U-shaped channels 26A, 26B (see also FIG. 4). Hinges 22A may extend through openings 88 (FIG. 3A) in breakaway web 32 of substrate 2. The doors 20A and 20B may be spaced apart from the ring structure 16 to form a gap 24, and end edges 28A, 28B of doors 20A, 20B opposite hinges 22A, 22B may be spaced apart to form a central gap 24A between end edges 28A, 28B. As shown in FIG. 4A, a portion 4A of foam 4 is disposed in a gap 40A between metal door assembly 3 (e.g. doors 20A and 20B) and upper skin 5. As discussed in more detail below in connection with FIGS. 6-8, during fabrication a layer of material such as paper or tape 35 is positioned on door assembly 3 (e.g. adhered to door assembly 3) to prevent foam 4 from entering gaps 24 and 24A whereby a space 40 between doors 20A, 20B and breakaway portion 32 of substrate 2 does not fill with foam. It will be understood, however, that tape 35 does not necessarily seal gaps 24, 24A perfectly, and some foam 4 may in some cases enter space 40. A score line 41 (FIG. 4A) may be formed in lower surface 5A of upper skin 5 above the gap 24A between edges 28A, 28B of doors 20A, 20B before foam 4 is introduced between door assembly 3 and skin 5. After foam 4 is injected, a cut 43 is made in foam 4 by inserting a knife 33 through an opening 21 in substrate 2 and through gap 24A. As discussed in more detail below in connection with FIG. 5, when airbag 68 of airbag module 30 is deployed, doors 20A, 20B move upwardly and skin 5 tears at score line 41, and foam 4 separates at cut 43. As shown in FIG. 4, airbag module 30 may be secured to a lower side 29 of substrate 2 below metal door assembly 3 utilizing studs 36 that are welded to ring structure 16 and extend through openings in flanges 31 of airbag module 30. Studs 36 engage nuts 37 whereby a portion of substrate 2 around breakaway web 32 is sandwiched between ring structure 16 and flanges 31 of airbag module 30. Doors 20A and 20B rotate upwardly as shown by the arrows "A" and "B" (FIG. 4), respectively, when airbag module 30 is deployed.

Referring again to FIG. 4, brow structure 8 extends along rear edge 9 of substrate 2. Brow structure 8 includes an upwardly facing surface 62 having a front edge 63 and a rear edge 64. A forwardly facing step or ramp surface 66 of brow structure 8 extends between edge 63 of surface 62 and a rear portion 67 of upper skin 5 of substrate 2. Step or ramp surface 66 may be angled whereby it faces both forwardly and upwardly as shown in FIG. 4.

With further reference to FIG. 5, when airbag module 30 is deployed, airbag 68 expands upwardly and ruptures breakaway web 32 of substrate 2. Web 32 may break apart along a center row 27A (FIG. 4A) of openings 27 that are vertically aligned with gap 24A between outer edges 28A, 28B of doors 20A, 20B. Substrate 2 may also rupture or bend along the outer rows of slots 27 on opposite side of center row 27A of slots 27. The expansion of airbag 68 also ruptures the foam 4 along cut 43 in foam 4 (FIG. 4) above the metal door assembly 3. Expansion of airbag 68 causes the doors 20A and 20B of door assembly 3 and portions 45A, 45B of foam 4 to pivot to the positions shown by the dashed lines 70A and 70B, thereby forming an opening 69 in topper structure 21. The upper skin 5 in the area above door assembly 3 ruptures along score line 41, and portions 47A, 47B of skin 5 also rotate with doors 20A, 20B. As it deploys, the airbag 68 expands upwardly and rearwardly over the step or ramp surface 66 and over upwardly facing surface 62 of brow structure 8. The airbag module 30 may be configured to deploy airbag 68 along a line "D" that is angled upwardly and rearwardly whereby the airbag 68 expands upwardly and rearwardly when deployed. The upper skin 5 of topper structure 21 may be positioned below the upper surface 62 of brow structure 8 to permit a driver and passenger in a front row of a vehicle to view the curved display surface 72 of dual horizon display 11, and the ramp surface 66 and upper surface 62 of brow structure 8 direct the airbag 68 upwardly and rearwardly as airbag 68 expands.

Figure 6:
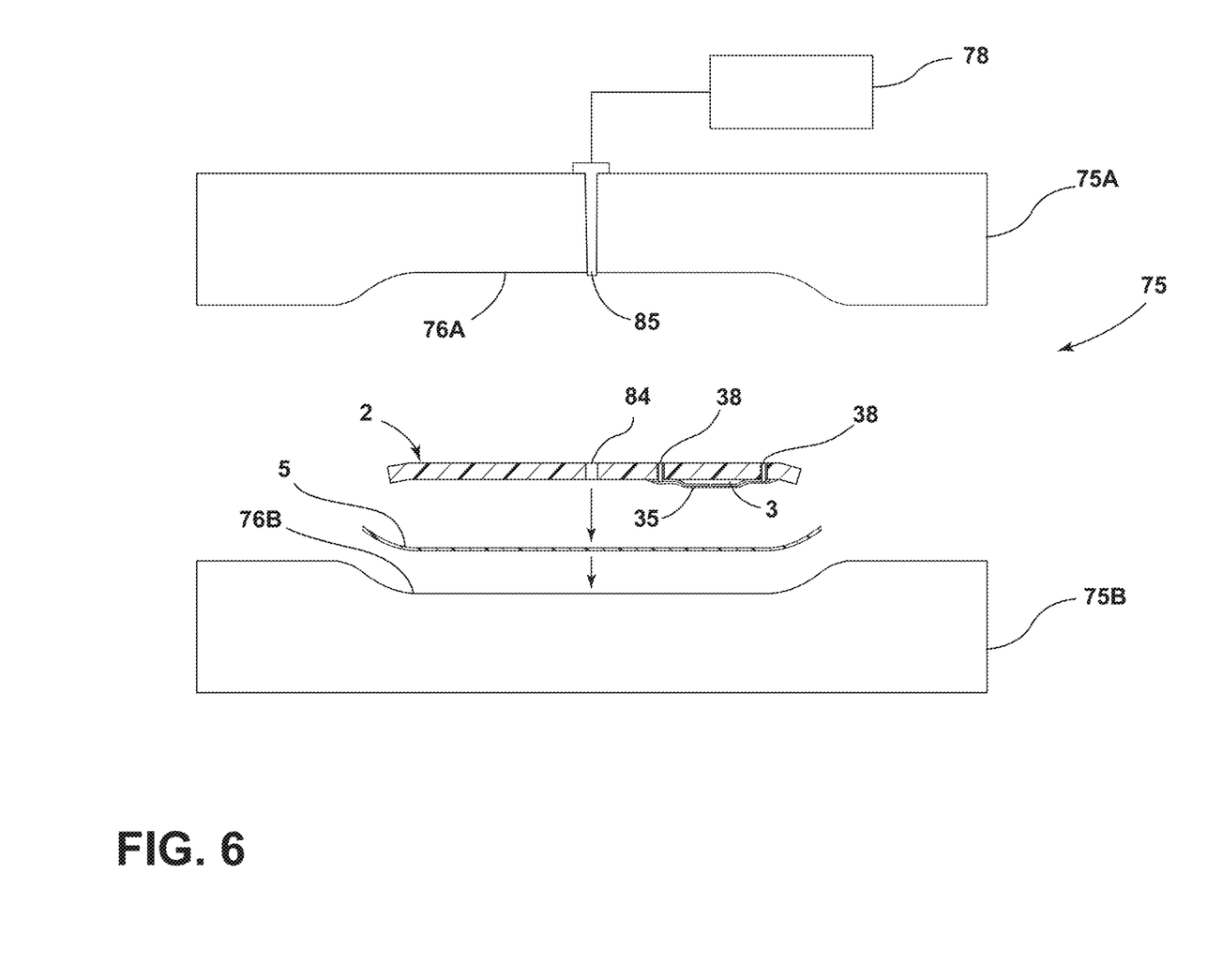
FIG. 6 is a partially schematic view showing fabrication of an instrument panel according to an aspect of the present disclosure.
Figure 7:
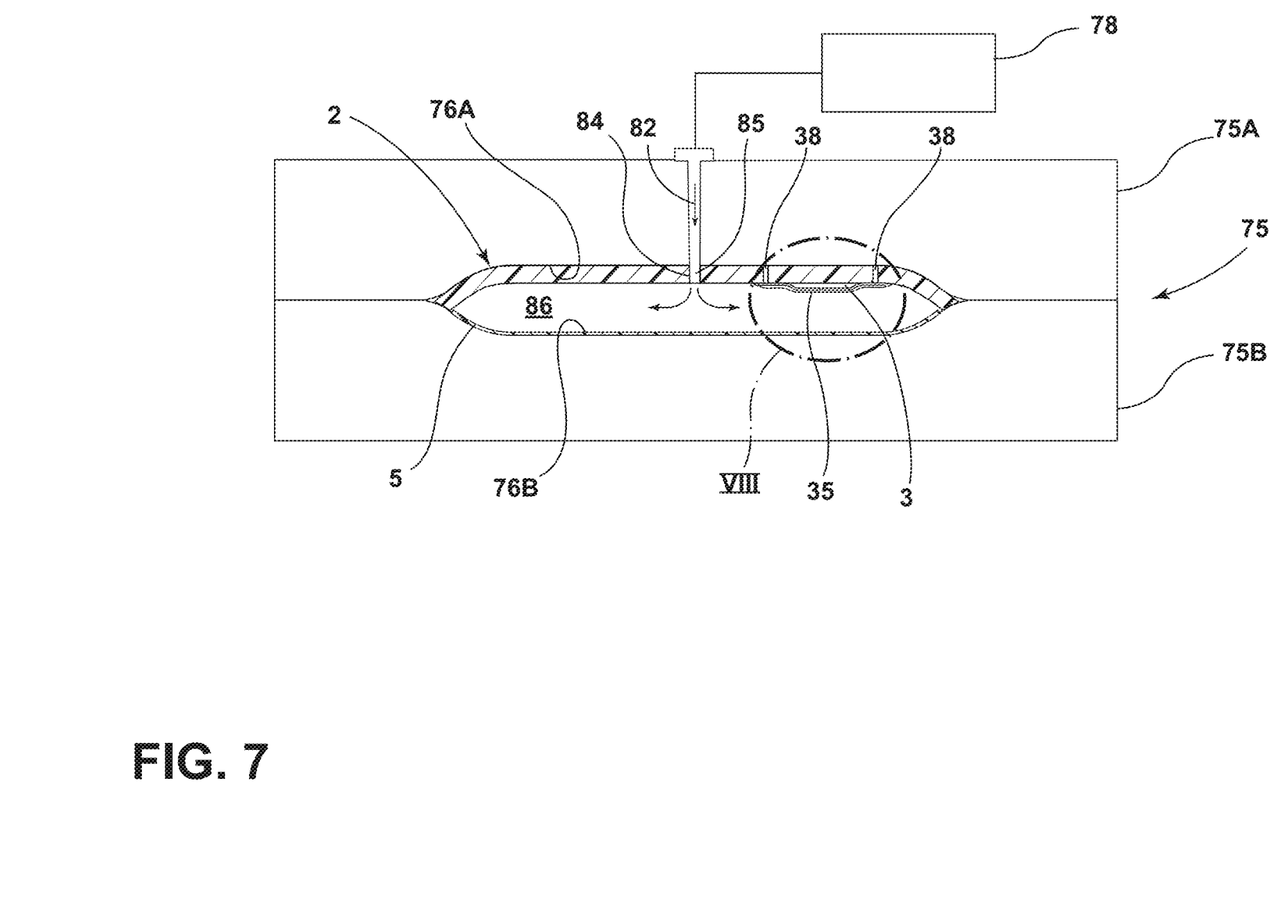
FIG. 7 is a partially schematic view showing fabrication of an instrument panel according to an aspect of the present disclosure.
Figure 8:
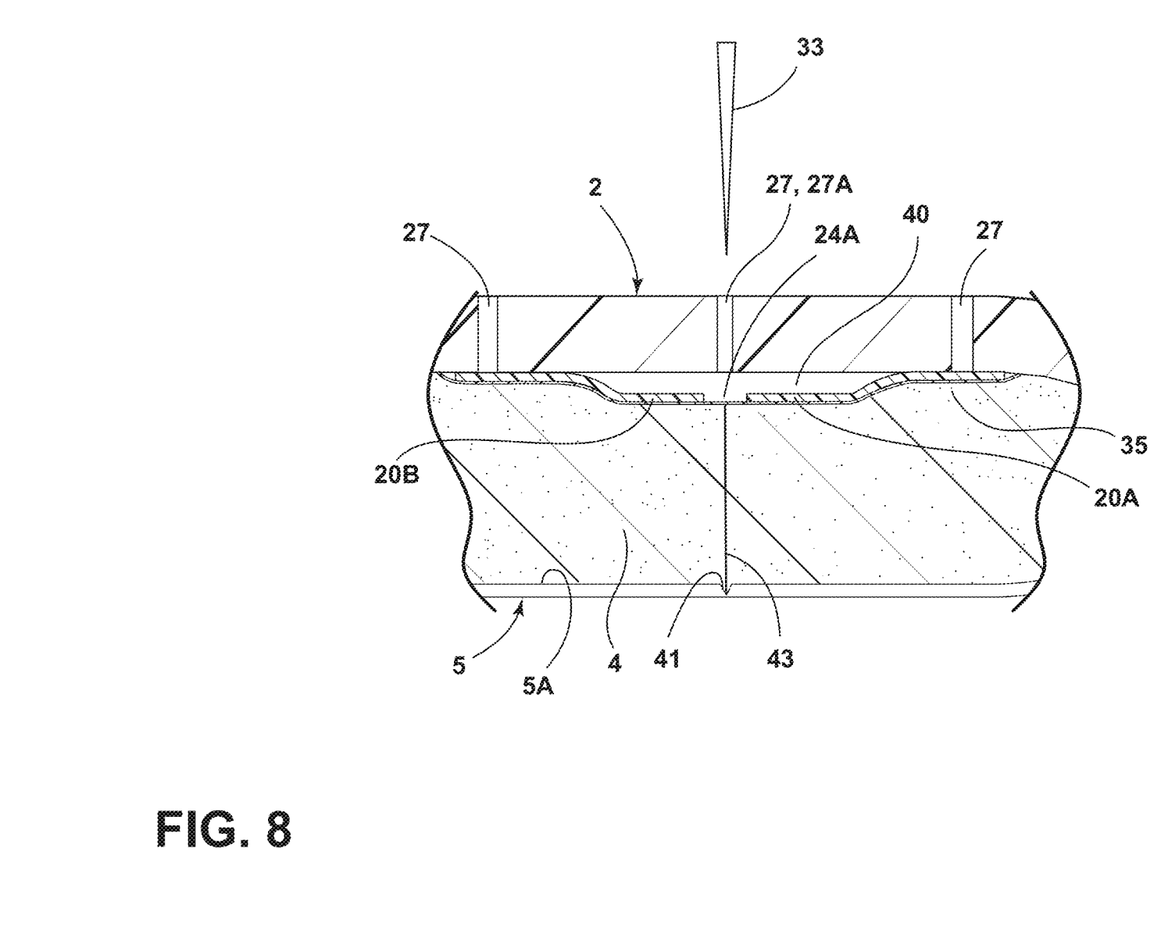
FIG. 8 is a partially fragmentary enlarged view of a portion of FIG. 7.

With further reference to FIGS. 6-8, during fabrication door assembly 3 is initially secured to substrate 2 utilizing suitable fasteners such as rivets 38 that extend through openings 39 (FIG. 3A) in metal door assembly 3 and openings in substrate 2. A layer of material 35 is then positioned on or over door assembly 3. The layer of material 35 may comprise, for example, a rectangular sheet of tape or other suitable material that is adhered to metal door assembly 3. Layer 35 ensures that foam 4 does not fill the space 40 between doors 20A and 20B and substrate 2.

Referring again to FIG. 6, a tool 75 having upper and lower parts 75A and 75B is used to fabricate topper structure 21. Upper skin 5 is initially positioned in cavity 76B of a lower tool part 75B, and the substrate 2 is then positioned on the skin 5. Upper skin 5 may be thin and flexible whereby it conforms to the counter of cavity 76B. Substrate 2 may be at least somewhat rigid whereby a space 86 (FIG. 7) is formed between skin 5 and substrate 2 when substrate 2 is positioned over skin 5 on lower tool part 75B. Substrate 2 may include an opening 84 that is configured to align with a foam injection port 85 of upper tool part 75. After skin 5 and substrate 2 are positioned in cavity 76B of lower tool part 75B (FIG. 6), the upper and lower tool parts 75A and 75B are brought together as shown in FIG. 7, and foam injection port 85 is received in opening 84 of substrate 2. Liquid foam 82 from a foam source 78 is then injected through opening 84 of substrate 2 into cavity 86 between substrate 2 and skin 5. The foam may comprise, for example, polyurethane foam or other suitable foam. Upper tool part 75A has a tool surface 76A that is configured to correspond closely to a contour of substrate 2 to thereby maintain the shape of substrate 2 when the liquid foam 82 is injected and during curing of the foam. The tool parts 75A and 75B may be separated after foam 4 cures, and topper structure 21 is then removed from the tool 75.

With further reference to FIG. 8, as noted above, skin 5 may include a score line 41 on surface 5A of skin 5. Score line 41 is formed on upper skin 5 before foam 4 is injected into space 86 between substrate 2 and skin 5. After the foam 4 solidifies, a knife 33 may be utilized to form a cut 43 in foam 4 by extending the knife 33 through a center row 27A of openings 27 in substrate 2, and through gap 24A between doors 20A and 20B. As discussed above in connection with FIG. 5, the score line 41 and cut 43 facilitate rupturing of foam 4 and skin 5 as doors 20A and 20B pivot to an open position while the airbag 68 is deployed.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An instrument panel for vehicles, the instrument panel comprising:
   a polymer substrate having a front edge, a rear edge, and a horizontal portion between the front and rear edges, the horizontal portion including a driver's side and a passenger's side;
   a metal airbag door assembly having a ring structure secured to an upper side of the horizontal portion of the polymer substrate on the passenger side thereof, wherein the ring structure extends around a central opening of the ring structure, the metal airbag door assembly including at least one door extending across a portion of the central opening, wherein the door is connected to the ring structure by a hinge;
   and wherein the polymer substrate includes a breakaway web disposed below the door of the metal airbag door assembly;
   an upper skin comprising at least one layer of cover material extending over a portion of the polymer substrate and over the metal airbag door assembly;
   foam disposed between the polymer substrate and the upper skin and between the metal airbag door assembly the upper skin; and
   an airbag module positioned below the breakaway web whereby, when the airbag module is deployed, an airbag of the airbag module expands and breaks through the breakaway web and the foam above the metal airbag door assembly, thereby causing the at least one door to move upwardly about the hinge whereby the upper skin ruptures to permit the airbag to expand and deploy above the upper skin.

2. The instrument panel of claim 1, wherein:
the hinge comprises metal that is configured to bend as the door moves upwardly when the airbag is deployed.

3. The instrument panel of claim 2, wherein:
the door and the ring structure are integrally formed from a single sheet of metal.

4. The instrument panel of claim 3, wherein:
the door comprises a first door; and including:
a second door connected to the ring structure whereby edges of the first and second door rotate upwardly relative to the ring structure and away from each other when the airbag is deployed.

5. The instrument panel of claim 4, wherein:
the first door and the second door are connected to the ring structure by metal hinges that are U-shaped in cross section with upwardly opening channels.

6. The instrument panel of claim 1, wherein:
the breakaway web comprises a plurality of elongated grooves and/or slots in the polymer substrate surrounding the breakaway web has a second thickness that is greater than the first thickness.

7. The instrument panel of claim 6, wherein:
the breakaway web is integrally formed with the region of the polymer substrate surrounding the breakaway web.

8. The instrument panel of claim 6, wherein:
the ring structure is secured to the region of the polymer substrate surrounding the breakaway web by mechanical fasteners.

9. The instrument panel of claim 1, wherein:
the front edge of the polymer substrate has a contour that is configured to correspond to a contour of a lower portion of a windshield of a vehicle; and including:
a curved panel extending along the front edge of the polymer substrate at a junction of the curved panel and the polymer substrate, the curved panel having a central portion including an angled step surface that faces upwardly and rearwardly; and
an upright dual horizon display extending along the front edge of the polymer substrate, the dual horizon display having a concave rear surface extending upwardly in front of the driver's and passenger's sides of the horizontal portion of the polymer substrate.

10. The instrument panel of claim 9, wherein:
the dual horizon display includes an upright convex front surface that is spaced apart from the angled step surface of the curved panel to form a gap therebetween that is V-shaped in cross section.

11. The instrument panel of claim 1, including:
a brow structure extending along the rear edge of the polymer substrate, the brow structure including an upwardly facing upper surface extending between front and rear edges of the upper surface, the brow structure further including a ramp surface extending between the upper skin and the front edge of the upper surface at an angle whereby the ramp surface faces upwardly and forwardly.

12. The instrument panel of claim 11, wherein:
the airbag module is configured to deploy the airbag upwardly and rearwardly whereby the airbag moves upwardly and rearwardly over the ramp surface and the upper surface of the brow structure.

13. The instrument panel of claim 12, wherein:
the upper surface of the brow structure has a convex curvature, and the rear edge of the upper surface of the brow structure is lower than the first edge of the upper surface of the brow structure.

14. An instrument panel for vehicles, the instrument panel comprising:
a substrate having a front edge, a rear edge, and a central portion between the front and rear edges;
an airbag door assembly having a base structure and at least one door connected to the base structure by a hinge;
an upper skin extending over at least a portion of the substrate and over the airbag door assembly;
foam disposed between the substrate and the upper skin and between the airbag door assembly and the upper skin; and
an airbag module positioned below the substrate whereby, when the airbag module is deployed, an airbag of the airbag module expands and breaks through the substrate and the foam above the airbag door assembly, thereby causing the at least one door to move upwardly about the hinge whereby the upper skin ruptures to permit the airbag to expand and deploy above the upper skin.

15. The instrument panel of claim 14, wherein:
the substrate includes a breakaway web disposed below the door of the airbag door assembly.

16. The instrument panel of claim 14, wherein:
the door and the breakaway web form a gap therebetween that is not filled with foam.

17. The instrument panel of claim 14, wherein:
the at least one door and the base structure are integrally formed from a single sheet of metal.

18. The instrument panel of claim 17, wherein:
the at least one door comprises first and second doors; and wherein:
the base structure comprises a ring structure extending around the first and second doors, wherein the first and second doors are pivotably connected to the ring structure, whereby edges of the first and second doors are spaced apart to form an elongated gap;
the foam includes an upright cut that is vertically aligned with the elongated gap whereby the foam separates along the upright cut when the first and second doors rotate open when the airbag is deployed.

19. A vehicle comprising:
a body having a cabin with a front driver side space and a front passenger side space;
an instrument panel main substrate secured to the body and positioned in front of the front driver side space and in front of the front passenger side space;
a topper substrate secured to a top side of the instrument panel main substrate, the topper substrate having a front edge, a rear edge, and a central portion between the front and rear edges, the central portion including a driver's side and a passenger side;
an airbag door assembly having a base structure secured to the topper substrate on the passenger side thereof, the airbag door assembly including at least one door connected to the base structure by a hinge;
and wherein the topper substrate includes a breakaway web disposed below the door of the airbag door assembly;
an upper skin extending over the central portion of the topper substrate and the airbag door assembly;

foam disposed between the topper substrate and the upper skin and between the airbag door assembly and the upper skin; and an airbag module positioned below the breakaway web whereby, when the airbag module is deployed, an airbag of the airbag module ruptures the breakaway web and the foam above the airbag door assembly, thereby causing the at least one door to pivot upwardly about the hinge whereby the upper skin ruptures to permit the airbag to expand and deploy above the upper skin.

20. The vehicle of claim 19, including:

a brow structure extending along the rear edge of the topper substrate, the brow structure including an upwardly facing upper surface extending between front and rear edges of the upper surface, the brow structure further including a forwardly and upwardly facing angled step surface extending between the upper skin and the front edge of the upper surface.

\* \* \* \* \*